Sept. 29, 1970    H. A. RAUSING ETAL    3,531,350
METHOD APPLICABLE TO A LAMINATE OF A CARRIER MATERIAL AND
A COATING MATERIAL FOR PRODUCING A WEB HAVING A STRIP OF
THE COATING MATERIAL PROJECTING BEYOND THE CARRIER
MATERIAL BY PREVENTING ADHESION ON
THE CARRIER MATERIAL
Filed March 31, 1966    2 Sheets-Sheet 1

INVENTORS
HANS A. RAUSING
GAD A. RAUSING
TORSTEN L. LINDH
KARL-ERIK EKSTROM

BY Earle R. Marsden
ATTORNEY

INVENTORS
HANS A. RAUSING
GAD A. RAUSING
TORSTEN L. LINDH
KARL-ERIK EKSTROM 3,531,350
METHOD APPLICABLE TO A LAMINATE OF A CARRIER MATERIAL AND A COATING MATERIAL FOR PRODUCING A WEB HAVING A STRIP OF THE COATING MATERIAL PROJECTING BEYOND THE CARRIER MATERIAL BY PREVENTING ADHESION ON THE CARRIER MATERIAL
Hans Anders Rausing, Gad Anders Rausing, Torsten Lennartson Lindh, and Karl-Erik Ekström, Lund, Sweden, assignors to AB Tetra Pak, Lund, Sweden, a Swedish company
Filed Mar. 31, 1966, Ser. No. 539,204
Claims priority, application Sweden, Apr. 15, 1965, 5,003/65
Int. Cl. B29b 1/00
U.S. Cl. 156—244                                    6 Claims

ABSTRACT OF THE DISCLOSURE

Method to provide a web material having a carrier material and a coating material thereon which is wider than the carrier material. The carrier material is coated and then a portion of the carrier material is cut away leaving a portion of the coated material exposed.

---

The present invention refers to a method applicable to a laminate of a carrier material and a coating material for producing a web having a strip of the coating material projecting beyond the carrier material.

Preferably, the invention is conceived to be applied to the production of a web of the above-mentioned kind, which web is intended for manufacturing packages by tube formation and transverse sealing within narrow zones transversal in relation to the tube axis, the strip projecting from the carrier material being useful for sealing the cut edges of the carrier material for example by being folded around the latter and thereby producing a layer of the coating material uninterrupted around the periphery of the tube. As coating material a plastic material, for example, polyethylene or polypropylene, is preferably intended to be used. The carrier material may then consist for example of paper. The web produced by means of the invention may of course also be utilized for other purposes.

The invention will be described more closely in the following with reference to the accompanying drawings, which illustrate some different examples of how the invention may be practised.

Figure 9:
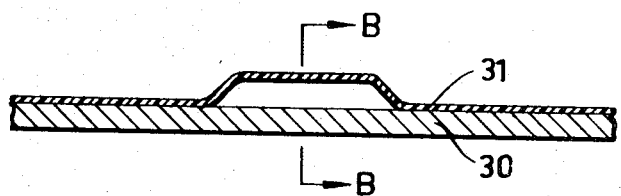

FIG. 9 finally shows a semi-manufactured article which has been produced by means of a device similar to that according to FIG. 2 in a manner indicated more closely below.

Figure 1:
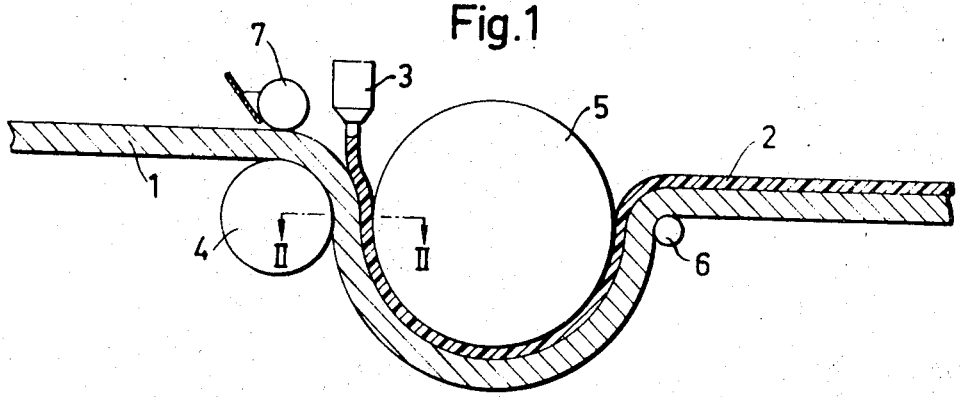
FIG. 1 shows diagrammatically, how a coating material is extruded and rolled together with a web-shaped carrier material in a calender-like device.

In the device shown in FIG. 1 a carrier material 1, for example paper, is coated with a coating material 2, for example plastic. The coating material 2 is extruded from a nozzle 3 and is rolled together with the carrier material in a nip between two rolls 4 and 5, the roll 4 for example being made from rubber and the roll 5 consisting of a refrigerated steel roll or the like. By 6 a deviation roll is designated. According to the invention, the coating material will now, as above mentioned, be prevented from adhering to the carrier material within a narrow longitudinal zone. This is brought about by means of the device shown in FIG. 1 through coating means 7 which coats said zone of the carrier material with an anti-adhesive.

Figure 2:
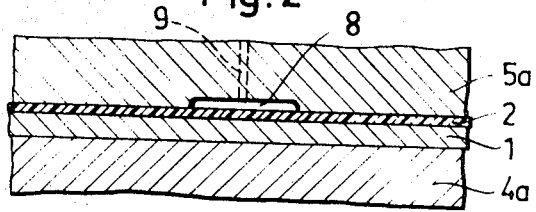
FIG. 2 shows a partial section along the line II—II in FIG. 1 in a corresponding slightly modified device.
Figure 3:
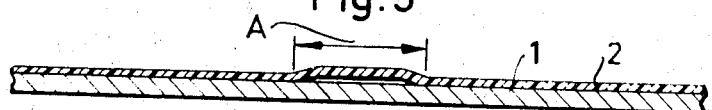
FIG. 3 shows a section through the laminate obtained by means of one of the devices according to FIGS. 1 and 2.

Alternatively, or in combination with the above, the adhesion may be prevented in the way suggested in FIG. 2, in which 4a and 5a designate two rolls, corresponding to the rolls 4 and 5, in a device of substantially the same kind as the device shown in FIG. 1. Nevertheless, the device according to FIG. 2 differs from that according to FIG. 1 by the fact that it does not need to be provided with any coating means. The roll 5a is instead provided with an annular groove 8 of substantially the same width as the coating means 7. Thanks to this annular groove 8 the rolling together of the two material layers 1 and 2 is prevented within a zone A running in the longitudinal direction of the web. See FIG. 3, in which the distance between the two layers has been exaggerated. Possibly a result corresponding to that shown in FIG. 3 may nevertheless be obtained. This is so if the annular groove 8 in the roll 5a is connected to a vacuum source through a channel 9, as is suggested by dash lines in FIG. 2. In this case, however, the annular groove 8 must be covered by a sealing sheet or the like outside the roll nip itself.

Figure 4:
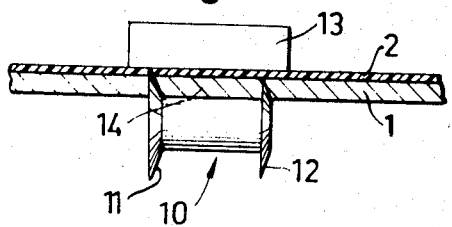
FIG. 4 shows an example of how the laminate obtained by means of one of the devices according to FIGS. 1 and 2 may be cut for producing a strip projecting from the carrier material.

In FIG. 4 it is shown how the laminate 1, 2 obtained according to FIG. 1 or 2 may be cut by means of a double cutting roll 10 having cutting wheels 11 and 12 against a back-up 13. By allowing the peripheral surface of the roll 10 to run on the carrier material 1 the cutting edges of the wheels 11 and 12 could be adjusted so that the wheel 11 cuts through both the layer 1 and the layer 2, while the wheel 12 cuts through only the layer 1.

Figure 5:
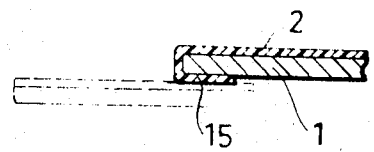
FIG. 5 shows a joint material and is intended to illustrate, how the strip obtained according to FIG. 4 may be utilized for sealing the cut edge obtained in the carrier material.

FIG. 5 shows a joint which has been made by means of the material cut according to FIG. 4 after removing the part 14 of the carrier material which is situated between the cutting wheels 11 and 12. As will be seen, the strip 15 then formed to project from the carrier material 1 has been folded around the free cut edge of the carrier material. Thereupon, as is shown by dash lines, a piece of material corresponding to the left hand part of the cut material, as seen in FIGS. 4 and 5, has been pushed in under the folded strip 15 and, together with the latter, attached to the bottom of the right hand part, for example by heat sealing. The last mentioned piece of material may, for example, consist of the opposite edge of the piece of material shown by full lines, after this has been formed into a tube. As will be apparent from the figure, the joint thus obtained presents an upwards continuous layer of the coating material.

Figure 6:
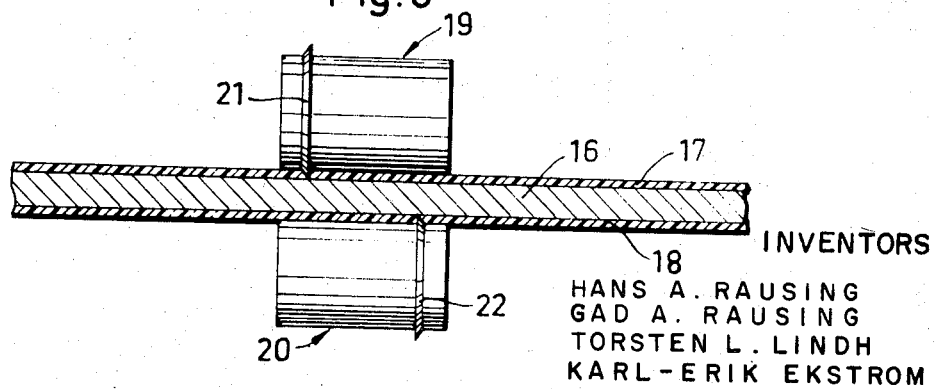
FIG. 6 shows, how the invention may be applied to a symmetrical carrier material coated on both sides in a way corresponding to either of those illustrated in FIGS. 1 and 2.

FIG. 6 shows a carrier material 16 coated on both sides, the two coating layers being designated by 17 and 18, respectively. The coating of the two sides has taken place symmetrically and by means corresponding to those according to FIGS. 1 and 2. Opposite the opposed zones of weak or no adhesion formed thereby the coating layer 17 and 18 is cut by means of cutting rolls 19 and 20 having cutting wheels 21 and 22.

Figure 7:
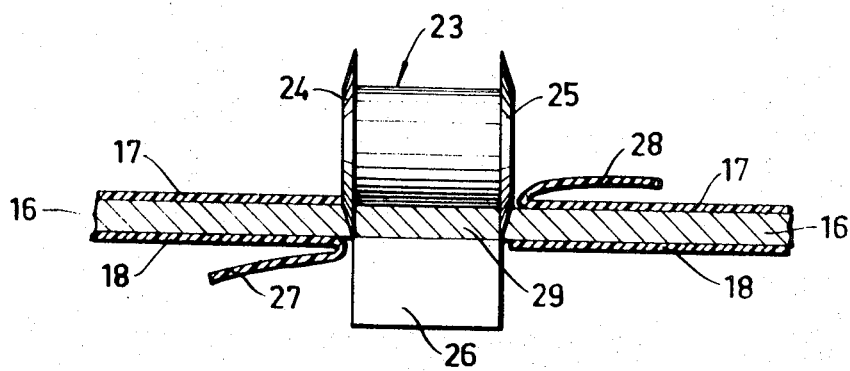
FIG. 7 shows an example how the material cut according to FIG. 6 may be further treated for producing the result pursued according to the invention.

In FIG. 7 it is shown how the material obtained according to FIG. 6 is cut by means of a cutting roll 23 having cutting wheels 24 and 25 and by means of a back-up 26. As is shown in the figure, this cutting takes place after the strips formed at the previous cutting operation have been folded away by any suitable means, for example scraper means or suction or compressed air nozzles.

Figure 8A:
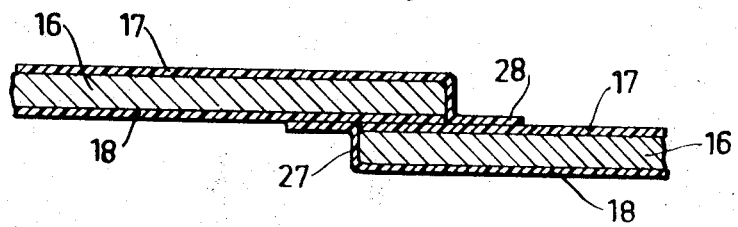
FIGS. 8a and 8b show two different types of joints which have been produced with the material obtained according to FIGS. 6 and 7.
Figure 8B:
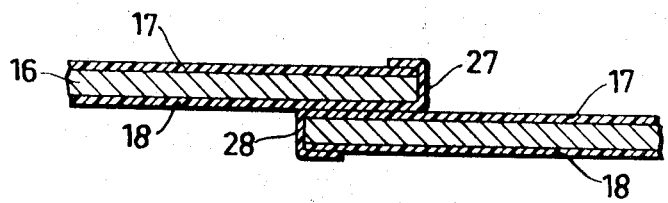

FIGS. 8a and 8b show two different types of joints which may be obtained by means of the material cut according to FIGS. 6 and 7, after the piece of material 29 between the cutting wheels 24 and 25 being removed.

Finally, FIG. 9 shows a laminate which has been obtained by means of a device similar to that according to FIG. 2, but with a heavily enlarged annular groove and by means of a powerful suction in this groove. If this laminate 30, 31 is cut along the line B—B, strips of coating material 31 projecting from the carrier material 30 will be obtained in the same way as above.

As will be understood, the invention is not limited to the examples described above but may be varied within the scope of the following claims. Thus, for example, the roll provided with an annular groove may be replaced by two rolls operating in parallel, spaced a distance corresponding to the actual zone width. Further, the cutting devices diagrammatically shown above may naturally be varied in a plurality of different ways. The laminates shown may furthermore be laminated with additional layers for achieving various functional characteristics or for changing the appearance.

That which is claimed is:

1. A method of producing a web of laminate material which has the coating material projecting beyond the carrier material comprising the steps of coating a thermoplastic material on a predetermined zone of a paper carrier material which is wider than said web, preventing adhesion of said thermoplastic coating material to said carrier material in a narrow longitudinal zone of said carrier material, and cutting said carrier material and said coating material in said narrow longitudinal zone after the coating thereof.

2. The method of claim 1 wherein said thermoplastic coating material is coated to said carrier material by running said material between a set of pressure rolls, and providing an area of reduced pressure between said rolls corresponding to said narrow longitudinal zone.

3. The method of claim 2 wherein said area of reduced pressure is placed into communication with a suction source to further reduce the pressure in said area of reduced pressure.

4. The method of claim 1 wherein said coating material is cut prior to the cutting of said carrier to allow the coating material to be folded out of the way.

5. The method of claim 1 wherein said cut in said carrier material is offset relative to the cut in said coating material.

6. A method of producing a web of laminate material which has the coating material projecting beyond the carrier material comprising the steps of: coating with a thermoplastic material a predetermined zone wider than said web on both sides of a paper carrier material, preventing adhesion of said thermoplastic coating material to said paper carrier material in a narrow longitudinal zone on both sides of said carrier material, cutting said coating material on both sides of said carrier in said narrow longitudinal zone with the cut on one side being spaced from the cut on the other side a distance substantially equal to the width of said narrow longitudinal zone, folding said coating material on both sides of said carrier away from said carrier material and severing and removing the carrier material in said narrow longitudinal zone.

References Cited

UNITED STATES PATENTS

| 2,505,430 | 4/1950 | Roberts | 156—285 X |
| 2,744,564 | 5/1956 | Woodburn | 156—268 X |
| 3,081,213 | 3/1963 | Chinn | 156—244 X |
| 3,130,647 | 4/1964 | Anderson et al. | 156—244 X |
| 3,392,076 | 7/1968 | Van der Pals | 156—244 |
| 3,399,096 | 8/1968 | Ranger | 156—244 X |

FOREIGN PATENTS

| 573,342 | 3/1959 | Canada. |

JOHN T. GOOLKASIAN, Primary Examiner

JOHN DOUGLAS SMITH, Assistant Examiner

U.S. Cl. X.R.

156—202, 248, 268, 270, 271, 285, 289; 161—145, 147, 149